United States Patent
Kajiwara et al.

(10) Patent No.: US 9,428,182 B2
(45) Date of Patent: Aug. 30, 2016

(54) VEHICLE WITH FUEL CELLS MOUNTED THEREON AND CONTROL METHOD OF THE VEHICLE

(71) Applicant: TOYOTA JIDOSHA KABUSHIKI KAISHA, Toyota-shi, Aichi-ken (JP)

(72) Inventors: Shigeto Kajiwara, Okazaki (JP); Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/938,531

(22) Filed: Nov. 11, 2015

(65) Prior Publication Data
US 2016/0137194 A1    May 19, 2016

(30) Foreign Application Priority Data

Nov. 13, 2014 (JP) .................................. 2014-230976
Apr. 24, 2015 (JP) .................................. 2015-088855

(51) Int. Cl.
| | |
|---|---|
| B60L 9/00 | (2006.01) |
| B60W 20/00 | (2016.01) |
| B60W 40/12 | (2012.01) |
| B60W 50/14 | (2012.01) |
| B60L 11/18 | (2006.01) |
| B60K 15/04 | (2006.01) |

(52) U.S. Cl.
CPC .............. *B60W 20/50* (2013.01); *B60K 15/04* (2013.01); *B60L 11/1883* (2013.01); *B60W 40/12* (2013.01); *B60W 50/14* (2013.01); *B60K 2015/0493* (2013.01); *B60W 2050/143* (2013.01)

(58) Field of Classification Search
USPC ......................................................... 701/22
See application file for complete search history.

(56) References Cited

U.S. PATENT DOCUMENTS

| | | | |
|---|---|---|---|
| 2003/0134167 A1* | 7/2003 | Hirakata | B60K 1/04 429/432 |
| 2004/0094230 A1 | 5/2004 | Ono et al. | |
| 2005/0092388 A1* | 5/2005 | Corless | B67D 7/3236 141/97 |
| 2006/0011164 A1* | 1/2006 | Kropinski | F02D 41/042 123/198 D |
| 2011/0265768 A1* | 11/2011 | Kerns | F02M 25/089 123/521 |
| 2013/0311037 A1* | 11/2013 | Ukai | G06F 17/00 701/36 |
| 2014/0012444 A1* | 1/2014 | Wake | B60L 11/1881 701/22 |
| 2015/0183316 A1* | 7/2015 | Wakamatsu | B60K 15/05 340/426.24 |

FOREIGN PATENT DOCUMENTS

| | | |
|---|---|---|
| JP | 2004-148980 | 5/2004 |
| JP | 2011-156896 | 8/2011 |
| JP | 2012-154299 | 8/2012 |
| JP | 2014-14207 | 1/2014 |
| WO | WO 2011/092561 | 8/2011 |

* cited by examiner

*Primary Examiner* — Hussein A. Elchanti

(74) *Attorney, Agent, or Firm* — Finnegan, Henderson, Farabow, Garrett & Dunner, LLP

(57) ABSTRACT

An object is to allow for the move of a vehicle even in the event of an abnormality in a lid sensor. A control method of a vehicle with a fuel cell mounted thereon comprises: (a) if a signal of a lid sensor that is configured to detect opening and closing of a lid door for a gas filler port of the vehicle indicates that the lid door is open, then prohibiting move of the vehicle; and (b) if it is judged that the lid sensor has a defect or if a predetermined special operation is performed, then eliminating prohibition of the move of the vehicle despite that the signal of the lid sensor indicates that the lid door is open.

10 Claims, 8 Drawing Sheets

VEHICLE WITH FUEL CELLS MOUNTED THEREON AND CONTROL METHOD OF THE VEHICLE

CROSS-REFERENCE TO RELATED APPLICATIONS

The present application claims priority from Japanese patent applications No. 2014-230976 filed on Nov. 13, 2014 and No. 2015-88855 filed on Apr. 24, 2015, the disclosures of which are hereby incorporated by reference into this application in their entireties.

BACKGROUND

1. Field

The present invention relates to a vehicle with fuel cells mounted thereon and a control method of the vehicle and more specifically relates to a technique of responding to the occurrence of abnormality in a lid sensor at a hydrogen inlet of a vehicle.

2. Related Art

JP2014-14207 A discloses a fuel cell vehicle including a hydrogen inlet port, a lid box that is configured to contain and protect the hydrogen inlet port, a lid sensor that is configured to detect opening and closing of a lid door of the lid box, and a vehicle speed sensor that is configured to detect a vehicle speed of the fuel cell vehicle. When opening of the lid door is detected and the vehicle speed is not higher than a stop criterion speed, this vehicle provides a transmission with parking lock and thereby does not allow the vehicle to run.

When the lid sensor has an open-fixed defect that continuously outputs a signal indicating that the lid door is open, the vehicle is not allowed to run (move) despite that the lid door is actually closed.

SUMMARY

In order to achieve at least part of the foregoing, the present invention provides various aspects described below.

(1) According to one aspect of the invention, there is provided a control method of a vehicle with a fuel cell mounted thereon. The control method comprises: (a) if a signal of a lid sensor that is configured to detect opening and closing of a lid door for a gas filler port of the vehicle indicates that the lid door is open, then prohibiting move of the vehicle; and (b) if it is judged that the lid sensor has a defect or if a predetermined special operation is performed, then eliminating prohibition of the move of the vehicle despite that the signal of the lid sensor indicates that the lid door is open. The control method of this aspect eliminates prohibition of the move of the vehicle (allows the vehicle to move) when the output signal of the lid sensor indicates that the lid door is open despite that the lid door is actually closed. This avoids prohibition of the move of the vehicle despite that the lid door is actually closed.

(2) The control method according to the aspect before, wherein the specific operation may be an operation of pressing a starter switch of the vehicle by a driver of the vehicle after repetition of a predetermined special operation processing loop a specified number of times, and the special operation processing loop may include: pressing the starter switch by the driver; providing a predetermined notification; and pressing the starter switch again by the driver. The control method of this aspect allows the prohibition of the move of the vehicle to be eliminated by input of the special operation that is unlikely to be performed during ordinary operation.

(3) The control method according to the aspect before, wherein the providing the notification may include at least one of notifying the driver of that the lid door is open, providing an instruction to close the lid door, and notifying the driver of a request for the specific operation. The control method of this aspect attracts the driver's attention.

(4) The control method according to the aspect before, wherein the providing the notification may include: providing a specific display by flashing a predetermined number of times or for a predetermined time duration; and turning off the specific display from flashing. The control method of this aspect more effectively attracts the driver's attention by providing the flashing specific display and turning off the specific display from flashing.

(5) The control method according to the aspect before, wherein if the signal of the lid sensor indicates that the lid door is closed to have a predetermined angle or less, then eliminating the prohibition of the move of the vehicle. If the lid door is substantially closed to have the predetermined angle or less, the lid door does not interfere with the move of the vehicle. The control method of this aspect accordingly determines that the lid sensor has a defect and eliminates the prohibition of the move of the vehicle.

The invention may be implemented by a variety of aspects other than the control method of a vehicle with a fuel cell mounted thereon, for example, a vehicle with fuel cells mounted thereon.

DESCRIPTION OF THE EMBODIMENTS

First Embodiment

Figure 1:
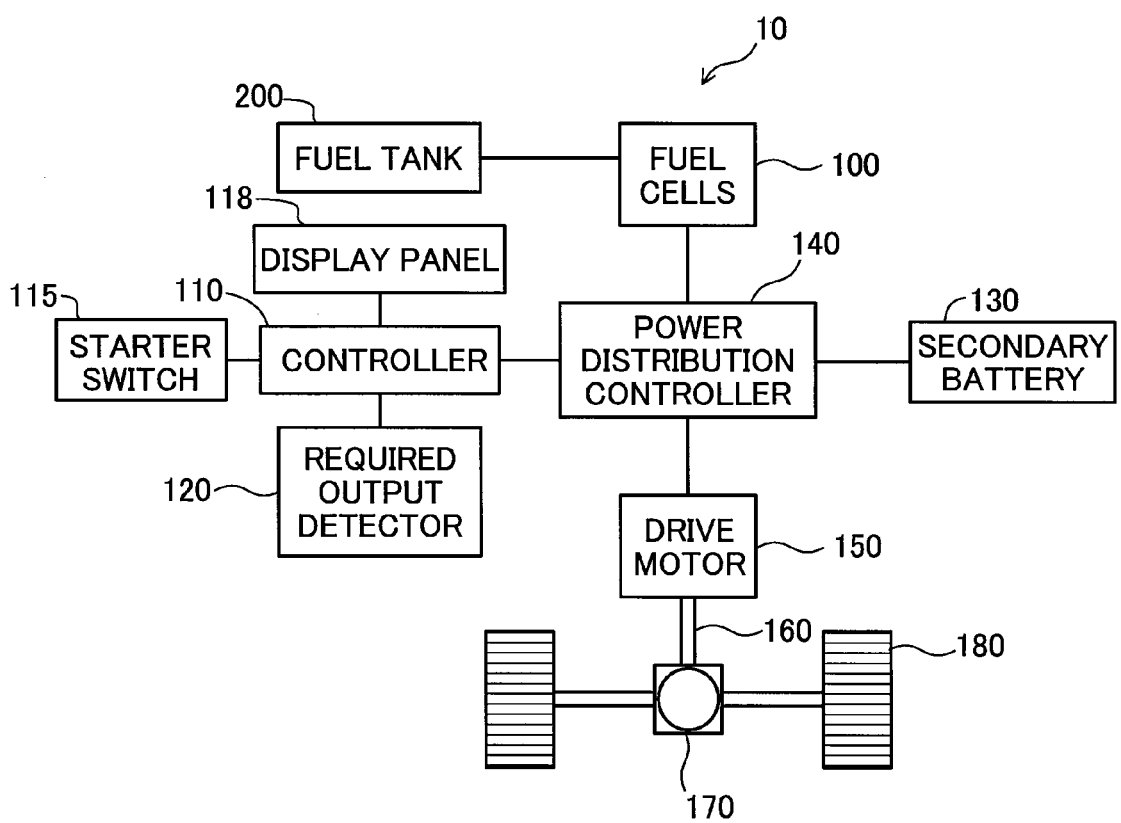
FIG. 1 is a diagram illustrating a vehicle with fuel cells mounted thereon.

FIG. 1 is a diagram illustrating a fuel cell vehicle 10 (hereinafter also simply called "vehicle 10") with fuel cells mounted thereon. The vehicle 10 includes fuel cells 100, a controller (also called "ECU (electronic control unit).") 110, a starter switch 115 (also called "ignition switch 115"), a display panel 118, a required output detector 120, a secondary battery 130, a power distribution controller 140, a drive motor 150, a driveshaft 160, a power distribution gear 170, wheels 180 and a fuel tank 200.

The fuel cells 100 are power generation devices configured to generate electric power through electrochemical reaction of a fuel gas with an oxidizing gas. The fuel tank 200 is configured to store the fuel gas for the fuel cells 100. This embodiment uses hydrogen as the fuel gas. The controller 110 controls the operations of the fuel cells 100 and the secondary battery 130, based on a required output value obtained from the required output detector 120. The required output detector 120 is configured to detect, for example, the driver's depression amount of an accelerator pedal (not shown) of the vehicle 10 and obtain the driver's required output (required output value) according to the detected depression amount of the accelerator pedal. The controller 110 computes a required amount of electric power for the fuel cells 100 from the required output value.

The starter switch 115 is provided as a main switch to change the state of the vehicle 10 among active states (ready-on state, accessories-on state and ignition-on state) and a stop state (off state). One press of the starter switch 115 without depression of a brake pedal switches the state of the vehicle 10 to the accessories-on state. Another press (second press) of the starter switch 115 switches the state of the vehicle 10 to the ignition-on (IG-on) state. Further another press (third press) of the starter switch 115 switches the state of the vehicle 10 to the off state. Further another press (fourth press) of the starter switch 115 switches the state of the vehicle 10 to the accessories-on state. In this manner, the state of the vehicle 10 is changed in the sequence of the accessories-on state, the ignition-on state and the off state by each press of the starter switch 115. The "accessories-on" state herein denotes an active state in which specified auxiliary machines having small power consumption, such as a car radio, are available. The "ignition-on" state herein denotes an active state in which specified auxiliary machines having large power consumption, such as an air conditioner, are available, in addition to those available in the accessories-on state. Neither the accessories-on state nor the ignition-on state enables the vehicle 10 to run. In any of the off state, the accessories-on state and the ignition-on state, a press of the starter switch 115 with depression of the brake pedal switches the state of the vehicle 10 to the ready-on state. The "ready-on" state herein denotes an active state that enables the vehicle 10 to run and move. The state of the vehicle 10 is switched to the ready-on state only when the driver presses the starter switch 115 while stepping on the brake pedal. In the ready-on state, the vehicle 10 is allowed to run and move. Braking is thus applied in advance, in order to avoid the vehicle 10 from moving against the driver's intention after the switching to the ready-on state. A press of the starter switch 115 in the ready-on state or in a move prohibition state (described later) switches the state of the vehicle 10 to the off state, irrespective of whether the driver depresses or does not depress the brake pedal. Switching the state of the vehicle 10 by each press of the starter switch 115 described above is only illustrative. The state of the vehicle 10 may be switched by pressing the starter switch 115 in a different way from that described above.

The display panel 118 is configured to display or provide information or the like used for driving of the vehicle 10, for example, the state of the vehicle 10 described above, speed of the vehicle 10, a direction indicator, a fuel indicator, an odometer and various alarms.

The secondary battery 130 is used as the electric power source of the drive motor 150 in the state that the fuel cells 100 have low power generation capability, for example, immediately after a start of the vehicle 10. Even in the state that the fuel cells 100 have high power generation capability, when sufficient electric power is accumulated in the secondary battery 130 by regeneration described later or the like, the secondary battery 130 may be used as the electric power source to operate the vehicle 10. Using the secondary battery 130 as the electric power source reduces the fuel consumption of the fuel cells 100. For example, a nickel hydride battery or a lithium ion battery may be used for the secondary battery 130. The secondary battery 130 may be charged directly with electric power output from the fuel cells 100 or may be charged with electric power regenerated from the kinetic energy of the vehicle 10 by the drive motor 150 during deceleration of the vehicle 10.

In response to a command received from the controller 110, the power distribution controller 140 controls the electric power that is to be supplied from the fuel cells 100 to the drive motor 150 and the electric power that is to be supplied from the secondary battery 130 to the drive motor 150. During deceleration of the vehicle 10, in response to a command received from the controller 110, the power distribution controller 140 supplies the electric power regenerated by the drive motor 150 into the secondary battery 130. The drive motor 150 serves as a motor for driving the wheels 180. During deceleration of the vehicle 10, the drive motor 150 serves as a generator to regenerate electrical energy from the kinetic energy of the vehicle 10. The driveshaft 160 serves as a rotating shaft to transmit the driving force generated by the drive motor 150 to the power distribution gear 170. The power distribution gear 170 distributes the driving force into the left and right wheels 180.

Figure 2:
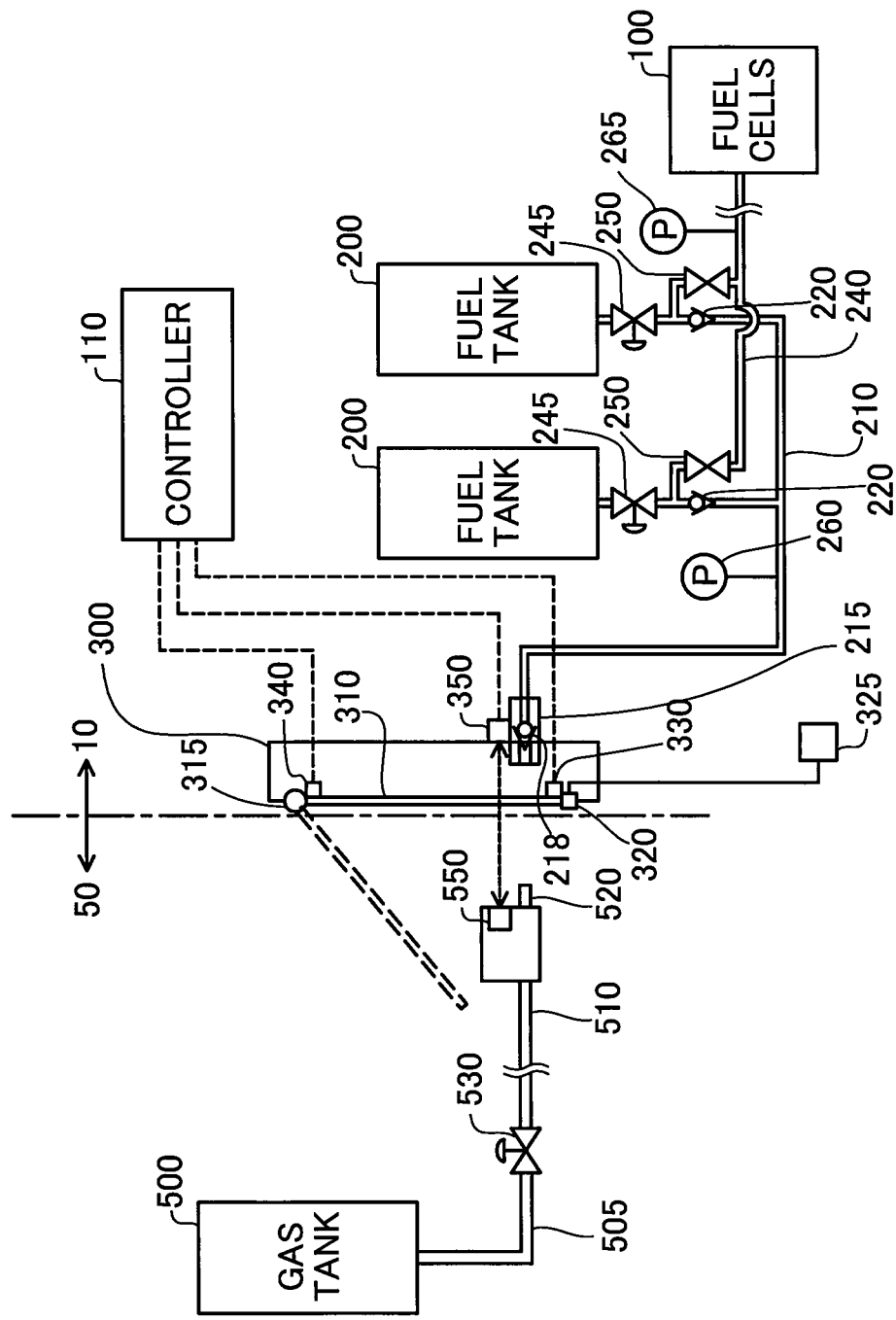
FIG. 2 is a diagram schematically illustrating a system from a filler portion of the fuel gas to a fuel tank.

FIG. 2 is a diagram schematically illustrating a system from a filler portion of the fuel gas to a fuel tank. FIG. 2 also illustrates part of a hydrogen station 50. The vehicle 10 includes at least one fuel tank 200, a receptacle 215 as a gas filler port, a fuel gas filler tube 210 arranged to connect the receptacle 215 with the fuel tank 200, a fuel gas supply tube 240 arranged to connect the fuel tank 200 with the fuel cells 100, and a lid box 300 configured to place the receptacle 215 therein. The hydrogen station 50 includes a gas tank 500, a gas supply tube 505 and a valve 530 connected with the gas tank 500, a gas supply hose 510 connected with the valve 530, a nozzle 520 provided at a leading end of the gas supply hose 510 and an infrared transceiver 550. The gas tank 500 is a tank configured to store hydrogen. The gas supply hose 510 is a flexible tube connected with the nozzle 520.

The receptacle 215 serves as a gas filler port for filling hydrogen and is configured to receive the nozzle 520 of the hydrogen station 50 fit therein. The receptacle 215 has a check valve 218 to prevent the back flow of hydrogen after filling. The fuel gas filler tube 210 is arranged to connect the receptacle 215 with the fuel tank 200 and includes a check valve 220. The check valve 220 serves to prevent the back flow of hydrogen filled in the fuel tank 200 toward the receptacle 215. A main stop valve 245 is provided between the check valve 220 and the fuel tank 200. A fuel tank 200-side end of the fuel gas supply tube 240 is connected between the check valve 220 and the main stop valve 245 in the fuel gas filler tube 210. A regulator 250 is provided in the fuel gas supply tube 240. The regulator 250 serves to regulate the pressure of the fuel gas that is to be supplied to the fuel cells 100. The configuration of this embodiment includes two fuel tanks 200 and accordingly includes two check valves 220, two main stop valves 245 and two regulators 250 corresponding to the respective fuel tanks 200. Pressure sensors 260 and 265 are respectively provided in the fuel gas filler tube 210 and in the fuel gas supply tube 240.

The lid box 300 serves to protect the receptacle 215. The lid box 300 includes a lid door 310, a hinge 315, a lid opener 320, lid sensors 330 and 340 and an infrared transceiver 350. The lid door 310 is provided as a cover of the lid box 300 and is coupled with the lid box 300 via the hinge 315. A spring (not shown) is provided at the hinge 315 to press the lid door 310 in an opening direction. The lid opener 320 (also called "lid open-close mechanism 320") is provided on the opposite side of the lid box 300 to the hinge 315. The lid open-close mechanism 320 has a function of keeping the lid door 310 in the closed position (locking function) and a function of releasing the closed position (unlocking function). A lid open button 325 is provided near to the driver's seat of the vehicle 10. In response to an operation of the lid open button 325, the lid open-close mechanism 320 is activated to open the lid door 310.

The lid box 300 has two lid sensors 330 and 340. The first lid sensor 330 is provided in the neighborhood of the lid opener 320, and the second lid sensor 340 is provided in the neighborhood of the hinge 315. When the lid door 310 is opened and closed, the two lid sensors 330 and 340 individually output a signal indicating whether the lid door 310 is open. The opening degree of the lid door 310 at switching of the output signal of the first lid sensor 330 from "open" to "closed" or from "closed" to "open" may be identical with but is preferably different from the opening degree of the lid door 310 at switching of the output signal of the second lid sensor 340 from "open" to "closed" or from "closed" to "open". The "opening degree of the lid door 310" herein denotes the angle of the open lid door 310 relative to 0 degree of the closed lid door 310. The first lid sensor 330 and the second lid sensor 340 may not be necessarily located in the neighborhood of the lid opener 320 and in the neighborhood of the hinge 315, respectively. The number of lid sensors is not limited to two but may be only one.

The infrared transceiver 350 is provided in the vicinity of the receptacle 215 to establish communication with the infrared transceiver 550 of the hydrogen station 50. The infrared transceiver 350 may not be necessarily located in the vicinity of the receptacle 215 but may be placed at any location that allows for communication with the infrared transceiver 550 of the hydrogen station 50. When the fuel tank 200 of the vehicle 10 is filled with hydrogen, the infrared transceiver 350 sends the conditions of hydrogen filling in the fuel tank 200 (for example, internal pressure and temperature of the fuel tank 200) to the infrared transceiver 550. A controller (not shown) of the hydrogen station 50 uses the internal pressure and temperature received via the infrared transceiver 550 to regulate the flow rate and the pressure of hydrogen that is to be supplied to the fuel tank 200.

Figure 3:
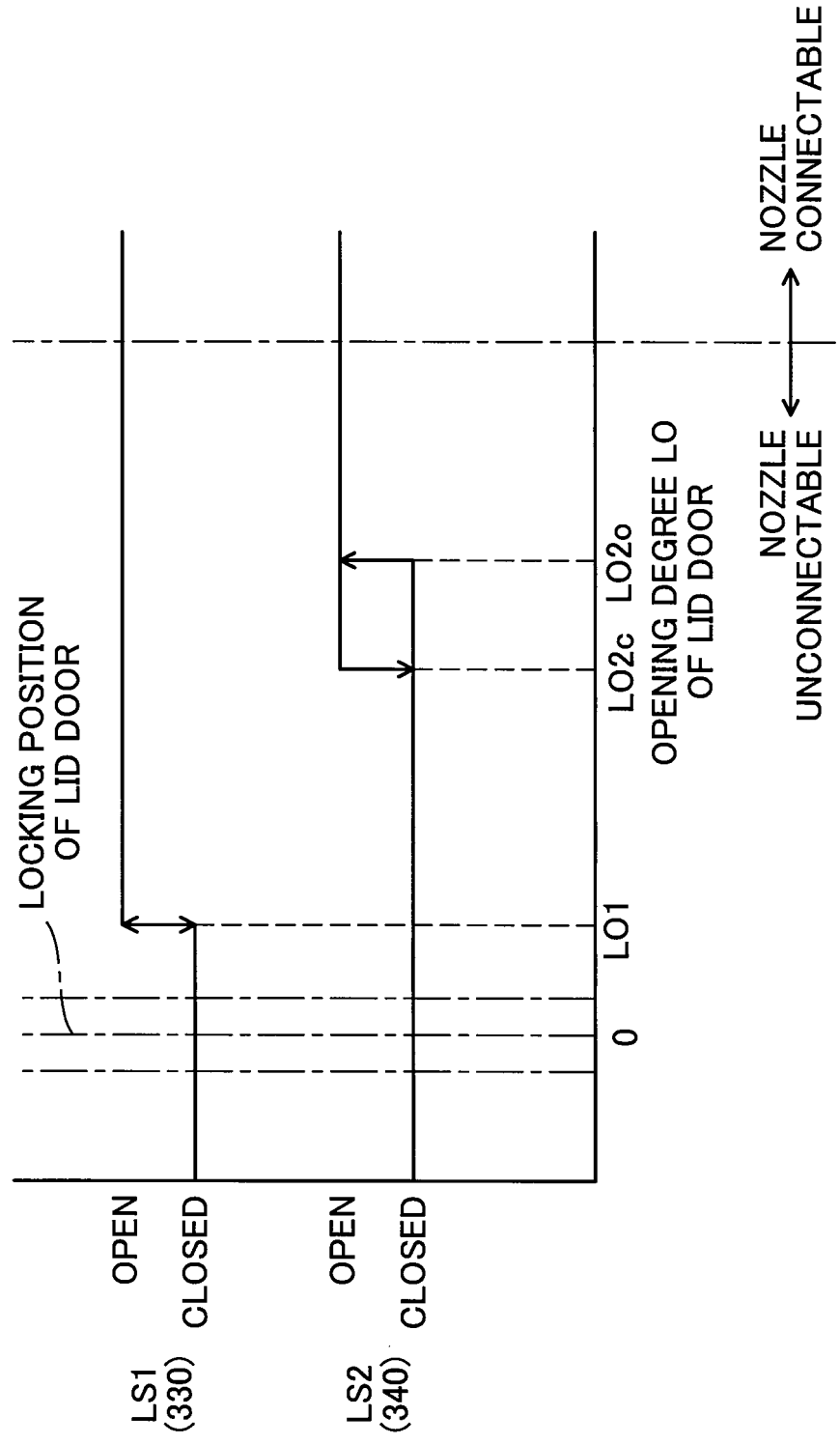
FIG. 3 is a diagram showing a relationship between opening degree of the lid door and output signals of the lid sensors.

FIG. 3 is a diagram showing a relationship between opening degree LO of the lid door 310 and output signals LS1 and LS2 of the lid sensors 330 and 340. In the description below, the output signals LS1 and LS2 are simply called "signals LS1 and LS2". The signal LS1 of the first lid sensor 330 is switched from "closed" to "open" at a small opening degree LO1 indicating the state that the lid door 310 is slightly open from the fully closed position (LO=0 degree). Similarly, when the lid door 310 is closed, the signal LS1 is switched from "open" to "closed" at this opening degree LO1. The signal LS2 of the second lid sensor 340 is, on the other hand, switched from "closed" to "open" when the opening degree of the lid door 310 reaches an opening degree LO2o that is larger than the opening degree LO1. When the lid door 310 is closed, the signal LS2 is switched from "open" to "closed" at an opening degree LO2c that is smaller than the opening degree LO2o. In other words, the signal LS2 of the second lid sensor 340 has hysteresis. The signal LS1 of the first lid sensor 330 may similarly have hysteresis. When the lid door 310 is opened to the position where the nozzle 520 of the hydrogen station 50 is insertable into the receptacle 215, both the signals LS1 and LS2 indicate "open".

Figure 4:
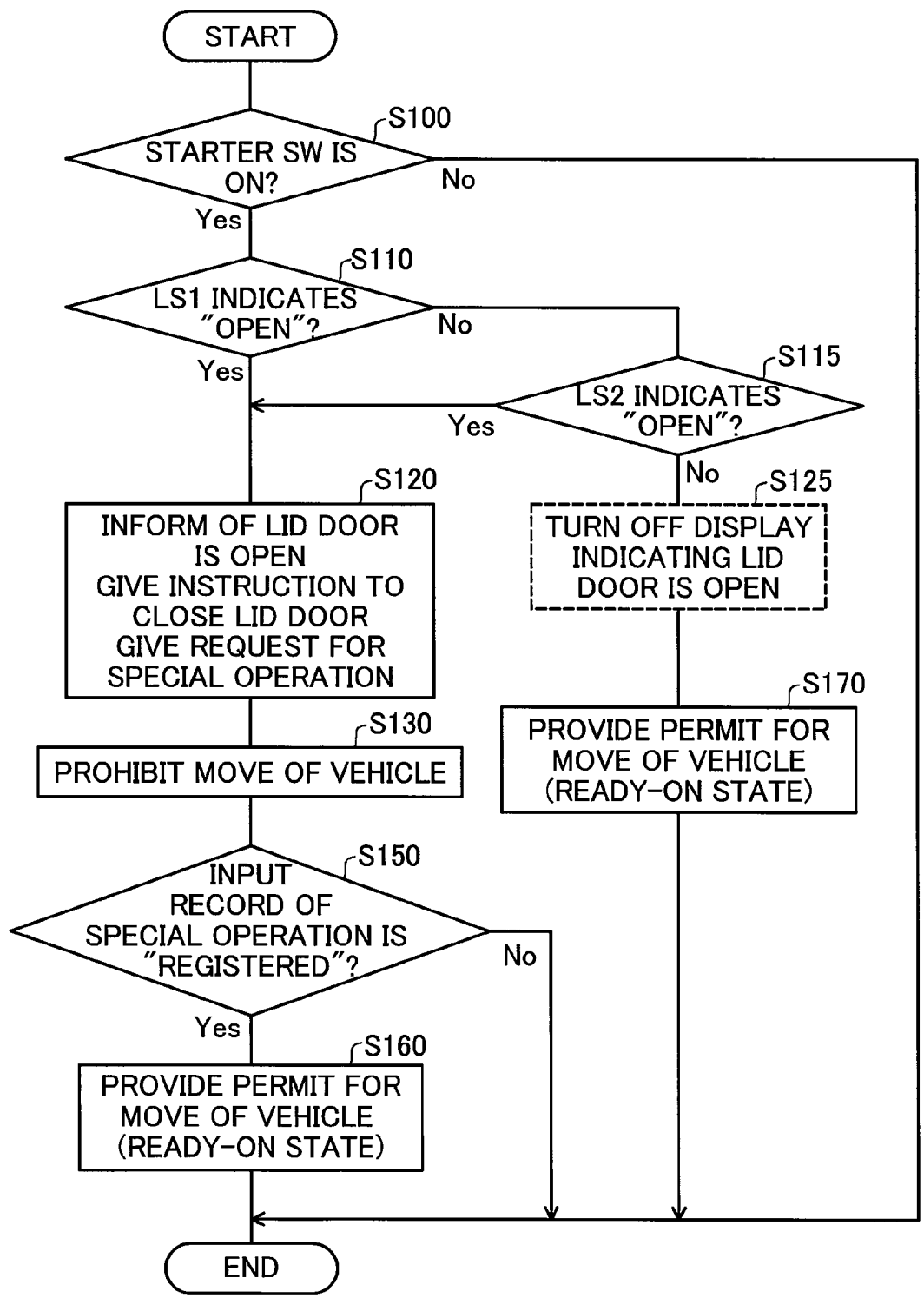
FIG. 4 is a flowchart showing a processing flow from an on operation of the starter switch of the vehicle after gas filling to the ready-on state.

FIG. 4 is a flowchart showing a processing flow from an on operation of the starter switch 115 of the vehicle 10 (shown in FIG. 1) after gas filling to the ready-on state. The controller 110 detects an on operation of the starter switch 115 at step S100 and proceeds to step S110. When not detecting an on operation of the starter switch 115 at step S100, on the other hand, the controller 110 terminates the processing flow. In the processing flow of FIG. 4, it is assumed that the starter switch 115 is pressed with depression of the brake pedal.

At step S110, the controller 110 determines whether the signal LS1 of the first lid sensor 330 indicates that the lid door 310 is "open". When the signal LS1 indicates "open" at step S110, the controller 110 proceeds to step S120 described later. When the signal LS1 indicates "closed" at step S110, on the other hand, the controller 110 proceeds to step S115 to determine whether the signal LS2 of the second lid sensor 340 indicates that the lid door 310 is "open". When the signal LS2 indicates "open" at step S115, the controller 110 proceeds to step S120. When the signal LS2 indicates "closed" at step S115, on the other hand, the controller 110 proceeds to step S170 described later. In other words, when at least one of the signals LS1 and LS2 of the two lid sensors 330 and 340 indicates "open", the controller 110 performs the processing of step S120. When both the two signals LS1 and LS2 indicate "closed", the controller 110 performs the processing of step S170. When the signal LS1 indicates "open" at step S110, the controller 110 may subsequently determine whether the signal LS2 of the second lid sensor 340 indicates "open", prior to the processing of step S120, like step S115. In this modified flow, the controller 110 performs the processing of step S120, irrespective of the result of this subsequent determination. Addition of this subsequent determination enables the state (1) that both the two signals LS1 and LS2 indicate "open" to be distinguished from the state (2) that one of the two signals LS1 and LS2 indicates "open" and the other indicates "closed".

At step S120, the controller 110 notifies the driver (user) of that the lid door 310 is open and gives the driver an instruction to close the lid door 310 and a request for a special operation to move the fuel cell vehicle 10. The notification, the instruction and the request are preferably provided by either one or both of voice and display on the display panel 118 (shown in FIG. 1). As the instruction to close the lid door 310, for example, the controller 110 may provide a command to close the lid door 310 in a predetermined time period. At subsequent step S130, the controller 110 prohibits the move of the vehicle 10 for the moment. For example, the controller 110 may perform a specified move prohibition operation to inactivate the drive motor 150 or to lock the gear. The sequence of step S120 and S130 may be inverted.

The controller 110 subsequently proceeds to step S150 to determine whether an input record of the special operation requested at step S120 is registered. The "special operation" herein denotes the driver's operation that is not performed in the general starting operation, for example, a gearshift operation, an operation of the accelerator pedal, an operation of the brake pedal or a key operation. "Input of special operation" denotes that the special operation is performed for the vehicle 10. Examples of the special operation include repeating ons and offs of the starter switch 115 several times, pumping the brake pedal a plurality of times (for example, five times or more), operating a shift lever with lighting a hazard lamp, or pressing the starter switch 115 with lighting the hazard lamp. The input record of the special operation is registered into the controller 110 as described later. When the input record of the special operation is not registered in a specified time period at step S150, the controller 110 terminates the processing flow and maintains the prohibition of the move of the vehicle 10. When the input record of the special operation is registered, on the other hand, the controller 110 proceeds to step S160 to determine that the signal LS1 of the first lid sensor 330 indicates an open-fixed defect or the signal LS2 of the second lid sensor 340 indicates an open-fixed defect and eliminate the prohibition of the move of the vehicle 10 for one trip to provide a permit for the move of the vehicle 10. "Providing a permit for the move of the vehicle 10" herein means that the drive motor 150 is activated to drive the wheels 180 in response to the driver's depression of the accelerator pedal. The power source at this moment may be either the fuel cells 100 or the secondary battery 130. "One trip" herein denotes a series of operations from a press of the starter switch 115 for switching to the ready-on state or the move prohibition state to another press of the starter switch 115 for switching to the off state.

When the signal LS2 of the second lid sensor 340 indicates "closed" at step S115, the controller 110 proceeds to step S170 to provide a permit for the move of the vehicle 10. In a configuration that a display indicating "open" is lit on the display panel 118 of the vehicle 10 when the lid door 310 is open, the controller 110 may additionally turn off the display indicating "open" (step S125). Furthermore, in a configuration that detection of an abnormality of either of the two lid sensors 330 and 340 is registered in the controller 110, the controller 110 may additionally eliminate the registry.

Figure 5:
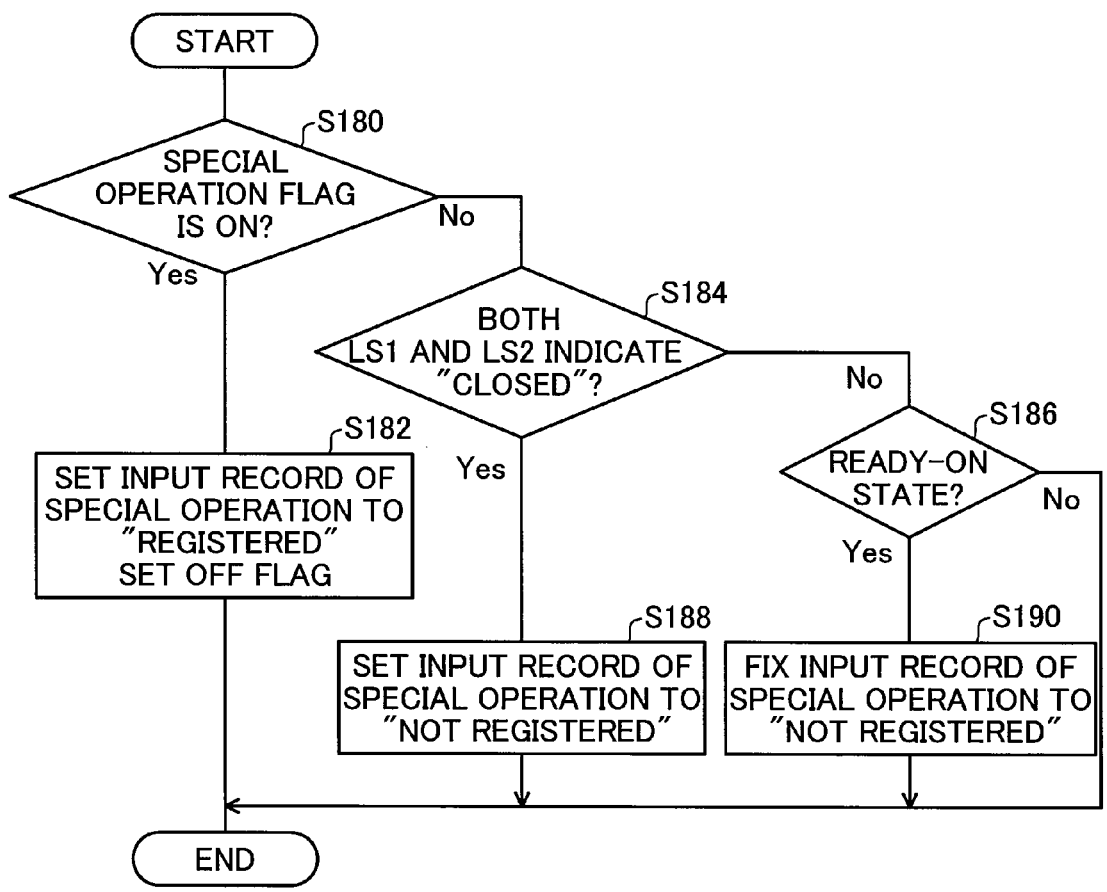
FIG. 5 is a flowchart showing a processing flow for registration and elimination of the input record of the special operation.

FIG. 5 is a flowchart showing a processing flow for registration and elimination of the input record of the special operation. This processing flow is triggered by an on operation of the starter switch 115 and is repeatedly performed at predetermined time intervals as the interrupt processing. The processing flow of FIG. 5 is performed at least once in a time period between giving the request for the special operation at step S120 of FIG. 4 and determining whether the input record of the special operation is registered at step S150. When the special operation is input, a flag (special operation input flag) is set on in the controller 110. At step S180, the controller 110 determines whether the special operation input flag is on or off, so as to determine whether the special operation is input. When determining that the special operation is input, the controller 110 sets the input record of the special operation to "registered" and sets off the special operation input flag at step S182. If the special operation input flag is not set off, the determination of step S180 in a second or subsequent cycle always provides an affirmative answer. This may result in a problem that the input record of the special operation is set to "registered" even when no special operation is input. In order to avoid this potential problem, the controller 110 sets off the special operation input flag at step S182.

When determining at step S180 that the special operation input flag is off, the controller 110 subsequently determines whether both the signals LS1 and LS2 of the two lid sensors 330 and 340 indicate "closed" at step S184. When both the two signals LS1 and LS2 indicate "closed", it is determined that neither of the two lid sensors 330 and 340 has an open-fixed defect. The controller 110 accordingly sets the input record of the special operation to "not registered" at step S188. When it is determined that neither of the two lid sensors 330 and 340 has an open-fixed defect, the controller 110 eliminates the registry by setting the input record of the special operation to "not registered".

When at least one of the two signals LS2 and LS2 indicates "open" at step S184, the controller 110 determines whether the state of the vehicle 10 is the ready-on state at step S186. The ready-on state denotes the state that enables or permits the vehicle 10 to run and move, as described above. For example, when a permit for the move of the vehicle 10 is provided at step S160 in FIG. 4, the controller 110 sets the state of the vehicle 10 to the ready-on state. When it is determined at step S186 that the state of the vehicle 10 is the ready-on state, the controller 110 proceeds to step S190 to fix the input record of the special operation to "not registered". This fixed setting is not changeable until completion of repair of the lid box 300. In other words, once the input record of the special operation is fixed to "not registered" at step S190, even in the case of determination that the special operation input flag is on at step S180 in a subsequent cycle, the input record of the special operation is not allowed to be set to "registered". This results in limiting eliminating the prohibition of the move of the vehicle 10 by the input of the special operation to only once and prevents the prohibition from being unnecessarily eliminated many times. The limitation of the frequency of eliminating the prohibition may be a plurality of times instead of only once. When it is determined at step S186 that the state of the vehicle 10 is not the ready-on state, the controller 110 terminates the processing flow.

As described above, according to the embodiment, when at least one of the signals LS1 and LS2 of the two lid sensors 330 and 340 indicates "open", the controller 110 prohibits the move of the vehicle 10 for the moment at step S130. When it is determined that the special operation is input at subsequent step S150, the controller 110 detects an abnormality in either of the lid sensors 330 and 340 and eliminates the prohibition of the move of the vehicle 10 to provide a permit for the move of the vehicle 10.

According to this embodiment, when the special operation is input (step S150), the controller 110 eliminates the prohibition of the move of the vehicle 10 and provides a permit for the move of the vehicle 10. A modification may detect an abnormality in either of the lid sensors 330 and 340 by another method or another means without the input of the special operation and may eliminate the prohibition of the move of the vehicle 10 to provide a permit for the move of the vehicle 10. In one application of such modification, in the case of detection that the lid door 310 is very slightly open or, in other words, is substantially closed to have a predetermined angle or less, the controller 110 may detect an abnormality in either of the lid sensors 330 and 340 and provide a permit for the move of the vehicle 10. For example, when the signal LS1 of the first lid sensor 330 indicates "closed" but the signal LS2 of the second lid sensor 340 indicates "open", it is determined that either of the lid sensors 330 and 340 is abnormal. The signal LS1 indicating "closed" means that the opening degree of the lid door 310 is equal to or less than LO1. The signal LS2 indicating "open", on the other hand, means that the opening degree of the lid door 310 is equal to or larger than LO2o (LO2o>LO1). These results suggest that either of the lid sensors 330 and 340 is abnormal. Determination of whether the signal LS1 indicates a closed-fixed defect is described later in a third embodiment. When it is determined that the signal LS1 is not abnormal, it is considered that the signal LS2 indicates an open-fixed defect. In this case, it is suggested that the lid door 310 is substantially closed to have the predetermined angle or less (not larger than LO1) sufficiently close to the fully closed position. In response to detection that the lid door 310 is substantially closed to have the predetermined angle or less, the controller 110 may allow the vehicle 10 to move (provide a permit for the move of the vehicle 10), irrespective of whether either of the lid sensors 330 and 340 is abnormal. Instead of using the two lid sensors 330 and 340, a lid sensor configured to detect the angle may be used for such detection. One of the two lid sensors 330 and 340 may be replaced with a lid sensor configured to detect the angle.

Second Embodiment

Figure 6:
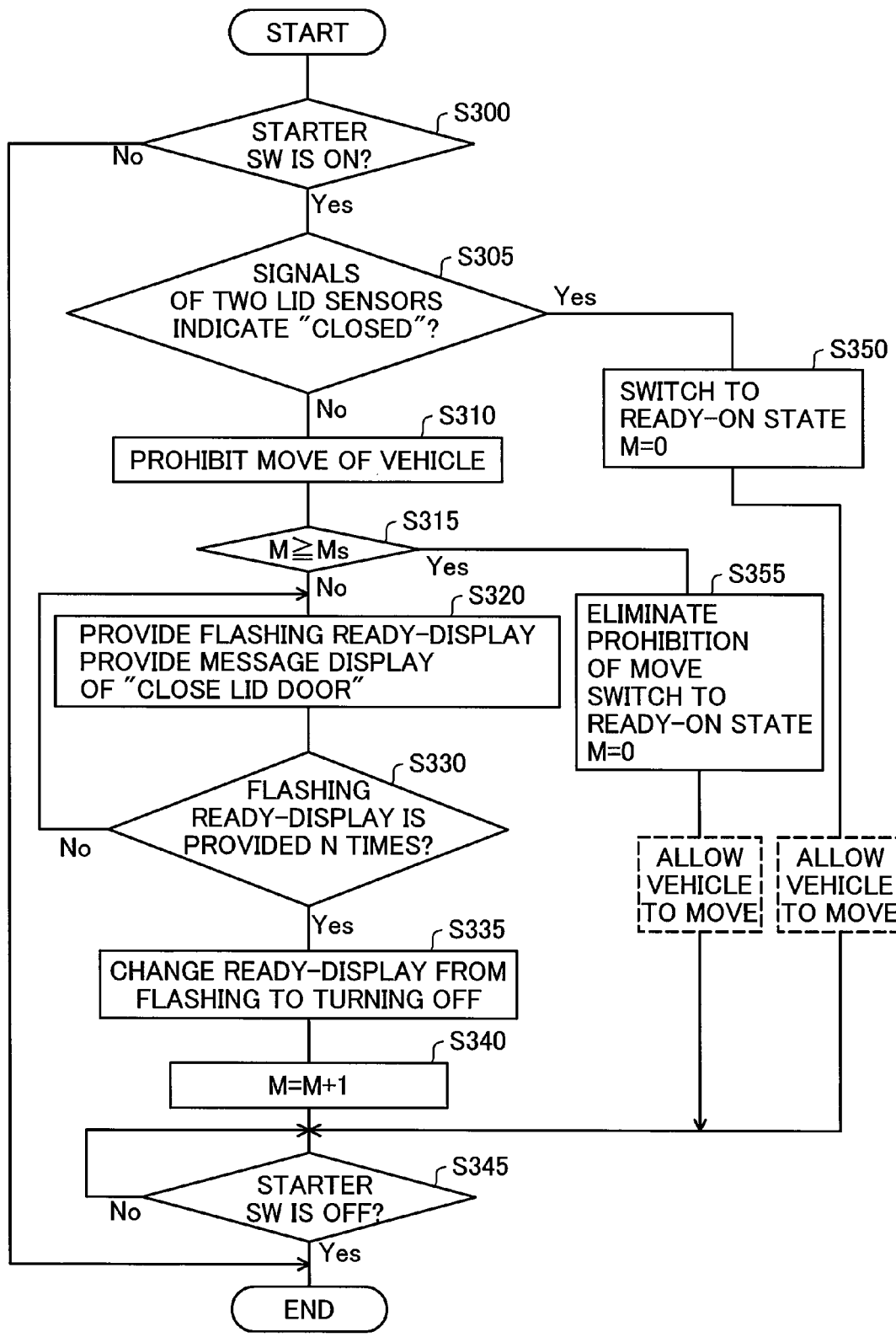
FIG. 6 is a flowchart showing a processing flow from an on operation of the starter switch of the vehicle to an off operation of the starter switch according to a second embodiment.

FIG. 6 is a flowchart showing a processing flow from an on operation of the starter switch 115 of the vehicle 10 to an off operation of the starter switch 115 according to a second embodiment. The configuration of the vehicle 10 according to the second embodiment is similar to the configuration of the first embodiment shown in FIGS. 1 and 2. According to the second embodiment, when either one of the signals LS1 and LS2 of the two lid sensors 330 and 340 indicates "open", ons and offs of the starter switch 115 are repeated a specified number of times under a predetermined condition as the special operation, in order to eliminate the prohibition of the move of the vehicle 10 and set the state of the vehicle 10 to the ready-on state so as to allow the vehicle 10 to move.

The controller 110 detects a press of the starter switch 115 (on operation) with depression of the brake pedal at step S300 and proceeds to step S305. When not detecting a press of the starter switch 115 at step S300, on the other hand, the controller 110 terminates the processing flow. Each press of the starter switch 115 without depression of the brake pedal sequentially changes the state of the vehicle to the accessories-on state, the ignition-on state and the off state as described above. In response to detection of a press of the starter switch 115 with depression of the brake pedal in the accessories-on state or in the ignition-on state, the controller 110 also proceeds to step S305.

At step S305, the controller 110 determines whether both the two signals LS1 and LS2 indicate "closed". When both the two signals LS1 and LS2 indicate "closed", the controller 110 proceeds to step S350 described later. When at least one of the two signals LS1 and LS2 indicates "open", on the other hand, the controller 110 prohibits the move of the vehicle 10 at step S310.

At subsequent step S315, the controller 110 determines whether an execution frequency M of a special operation processing loop is equal to or greater than a reference number of times Ms (where Ms represent a predetermined integral number of not less than 1). The "special operation processing loop" denotes a series of processing flow from step S300 (on operation of the starter switch 115) to step S345 described later (off operation of the starter switch 115). Performing the series of processing flow from step S300 to step S345 indicates executing one cycle of the special operation processing loop. When the execution frequency M of the special operation processing loop is equal to or greater than Ms, the controller 110 proceeds to step S355 described later. When the execution frequency M of the special operation processing loop is less than Ms, on the other hand, the controller 110 proceeds to step S320.

At step S320, the controller 110 provides a flashing display of a letter string "Ready" and a message display of "Close the lid door" on the display panel 118 (shown in FIG. 1). The flashing display of the letter string "Ready" indicates transition to the ready-on state. Upon success of switching to the ready-on state, the display of the letter string "Ready" is kept on. Upon failure in switching to the ready-on state, on the other hand, the display is turned off as described later. The display indicating "switching to the ready-on state" is not limited to the display of the letter string "Ready", but may be provided by lighting on a specific lamp such as a green lamp or may be provided by a specified display using part of the display panel 118. The display of the letter string "Ready" may be provided by using a lamp or part of the display panel 118 and is thus included in the specified display. In the description below, this specified display is called "ready-display". The message display of "Close the lid door" corresponds to the "display indicating that the lid door is open". The controller 110 may provide a voice notification or voice guide of "close the lid door", instead of the message display of "Close the lid door". The controller 110 may also provide an alarm display on the display panel 118 or a voice alarm to inform the driver of that "the lid door is open". The controller 110 may provide the ready-display and the message display in any sequence at different timings or simultaneously. The flashing cycle of the ready-display is preferably about 0.5 seconds to 2 seconds. When the flashing cycle depends on the voltage of, for example, a battery (not shown), however, the flashing cycle may be varied in one identical vehicle. There is no need to strictly determine the flashing cycle. According to the first embodiment, the controller 110 gives a notification of or a request for the special operation to eliminate the prohibition of the move of the fuel cell vehicle 10. According to the second embodiment, the controller 110 may not necessarily give a notification of or a request for the special operation. The controller 110 may provide at least one of the notification of "close the lid door", the notification or the alarm of "the lid door is open" and the request for the special operation.

At step S330, the controller 110 determines whether the flashing ready-display is provided N times. The value of N is preferably 3 to 5. As described later, according to this embodiment, the controller 110 performs a special operation to set the ready-on state when at least one of the two signals LS1 and LS2 is "open". More specifically, the controller 110 requires execution of the special operation processing loop from step S300 to step S345 Ms times (where Ms represents a predetermined integral number of not less than 1) as the special operation. Each cycle of the special operation processing loop includes providing the flashing ready-display N times. Setting a large number of times to N extends the time period required for setting the state of the vehicle 10 to the ready-on state. The number of times N is thus preferably not greater than ten times and is preferably three times to five times. After providing the flashing ready-display N times, the controller 110 proceeds to step S335. When the frequency of providing the flashing ready-display is less than N times, the controller 110 returns to step S320. The controller 110 may use a time duration when the flashing ready-display is continuously provided, instead of the frequency of providing the flashing ready-display. In this application, the time duration of the flashing ready-display may be about 5 to 10 seconds.

At step S335, the controller 110 turns off the flashing ready-display. Turning off the ready-display notifies the driver of the vehicle 10 of a failure in switching the state of the vehicle 10 to the ready-on state and an option for switching to the ready-on state by a special operation. The processing of step S320 (flashing the ready-display) and step S335 (turning off the flashing ready-display) may be omitted as appropriate. Flashing the ready-display is, however, preferable since it more effectively attracts the driver's attention.

At step S340, the controller 110 increments the execution frequency M of the special operation processing loop by one. The process of incrementing the execution frequency M by one at step S140 may be performed at any timing after step S300 and before step S345. At step S345, the controller 110 waits for another press of the starter switch 115 as an off operation of the starter switch 115. The vehicle 10 is maintained in the move prohibition state until another press of the starter switch 115. In response to another press of the starter switch 115, the controller 110 terminates the processing flow.

When both the two signals LS1 and LS2 indicate "closed" at step S305, the controller 110 proceeds to step S350 to set the state of the vehicle 10 to the ready-on state and allow the vehicle 10 to move. When the state of the vehicle 10 is set to the ready-on state, the ready-display may be kept on. At step S350, the controller 110 also resets the execution frequency M of the special operation processing loop to zero. Such resetting prevents the state of the vehicle 10 from being switched to the ready-on state unless the starter switch 115 is pressed after repetition of the special operation processing loop Ms times, when at least one of the two signals LS1 and LS2 indicates a defect. After switching the state of the vehicle 10 to the ready-on state, the controller 110 proceeds to step S345. The vehicle 10 is allowed to move until an off operation of the starter switch 115 at step S345.

After repetition of the special operation processing loop Ms times, the controller 110 proceeds from step S315 to step S355 to eliminate the prohibition of the move of the vehicle 10, set the state of the vehicle 10 to the ready-on state and reset the execution frequency M of the special operation processing loop to zero like step S350. As described above, even when at least one of the two signals LS1 and LS2 indicates "open", in response to an on operation of the starter switch 115 after repetition of the special operation processing loop Ms times, the controller 110 sets the state of the vehicle to the ready-on state. When the execution frequency M of the special operation processing loop reaches or exceeds the reference number of times Ms, the controller 110 recognizes the input of the special operation and sets the state of the vehicle 10 to the ready-on state. When the controller 110 then resets the execution frequency M of the special operation processing loop to zero or at least one of the two signals LS1 and LS2 indicates "open", the state of the vehicle 10 is allowed to be switched to the ready-on state by a press of the starter switch 115 only after repetition of the special operation processing loop Ms times again. Resetting the execution frequency M of the special operation processing loop to zero allows the state of the vehicle 10 to be switched to the ready-on state only once in Ms times. After switching the state of the vehicle 10 to the ready-on state, the controller 110 proceeds to step S345. In this case, the vehicle 10 is also allowed to move until an off operation of the starter switch 115 at step S345.

As described above, according to the second embodiment, when at least one of the two signals LS1 and LS2 indicates "open", the controller 110 sets the state of the vehicle 10 to the ready-on state and allows the vehicle 10 to move only in the event of input of the special operation which includes repetition of the special operation processing loop Ms times (where Ms is a predetermined integral number of not less than 1) and a subsequent press of the starter switch 115.

The special operation processing loop includes pressing the starter switch 115 by the driver, providing a predetermined notification by the controller 110, and pressing the starter switch 115 again by the driver. The prohibition of the move of the vehicle is eliminated by input of the special operation that is unlikely to be performed during ordinary operation. Providing the notification may include at least one of notifying the driver of that the lid door 310 is open, providing an instruction to close the lid door 310 and notifying the driver of a request for the special operation, with a view to drawing the driver's attention. Providing the notification may include providing the ready-display by flashing a predetermined number of times or for a predetermined time duration and changing the ready-display from flashing to turning off. Flashing the ready-display causes the driver (user) to expect the allowance to drive, and subsequent turning off the ready-display disappoints the expectation. This more effectively attracts the driver's attention to the message display of "Close the lid door".

According to this embodiment, the reference number of times Ms is set to be not less than 1 as the criterion for execution of the special operation processing loop. The excessively small reference number of times Ms facilitates switching to the ready-on state by the special operation, while the excessively large reference number of times Ms extends the time period required for switching to the ready-on state. Accordingly, the reference number of times Ms for execution of the special operation processing loop is preferably 3 to 7 and is more preferably 5.

The special operation shown in FIG. 6 is, however, only illustrative. Any other suitable special operation may be required when a press of the starter button 115 fails to switch the state of the vehicle 10 to the ready-on state. For example, the special operation may be shifting the lever from the parking position to the drive position and again to the parking position and subsequently pressing the starter switch 115. The special operation may additionally require depressing the accelerator pedal before shifting the lever. In another example, the special operation may be pumping the brake pedal a plurality of times (for example, five times or more) and subsequently pressing the starter switch 115 with depression of the brake pedal. In yet another example, the special operation may be lighting the hazard lamp and subsequently pressing the starter switch 115 with depression of the brake pedal. When two or more of the operations described above are performed in combination, the input of the special operation may be detected to eliminate the prohibition of the move of the vehicle 10. The special operation for eliminating the prohibition of the move of the vehicle may be determined in advance for each vehicle among various options of the special operation.

The special operation processing loop preferably includes providing a notification of the requirement for input of the special operation to the driver after a press of the starter switch 115 when the signals LS1 and LS2 of the lid sensors 330 and 340 indicates that the lid door 310 is open, and requiring for another press of the starter switch 115 (off operation). "Providing the notification" may be, for example, providing the message display of "Close the lid door" on the display panel 118 as described above or providing an alarm or a voice notification.

The second embodiment does not provide a limitation on the frequency of switching to the ready-on state other than "allowing the state of vehicle to be switched to the ready-on state only once in Ms times". Like the first embodiment, a limitation may be provided on the frequency of switching to the ready-on state by the special operation.

Third Embodiment

In the case of a closed-fixed defect that both the signals LS1 and LS2 of the lid sensors 330 and 340 indicates "closed" despite that the lid door 310 is actually open, the vehicle 10 is likely to move in the state that the nozzle 520 of the hydrogen station 50 is connected with the receptacle 215 of the fuel cell vehicle 10. The third embodiment describes detection of such a closed-fixed defect.

Figure 7:
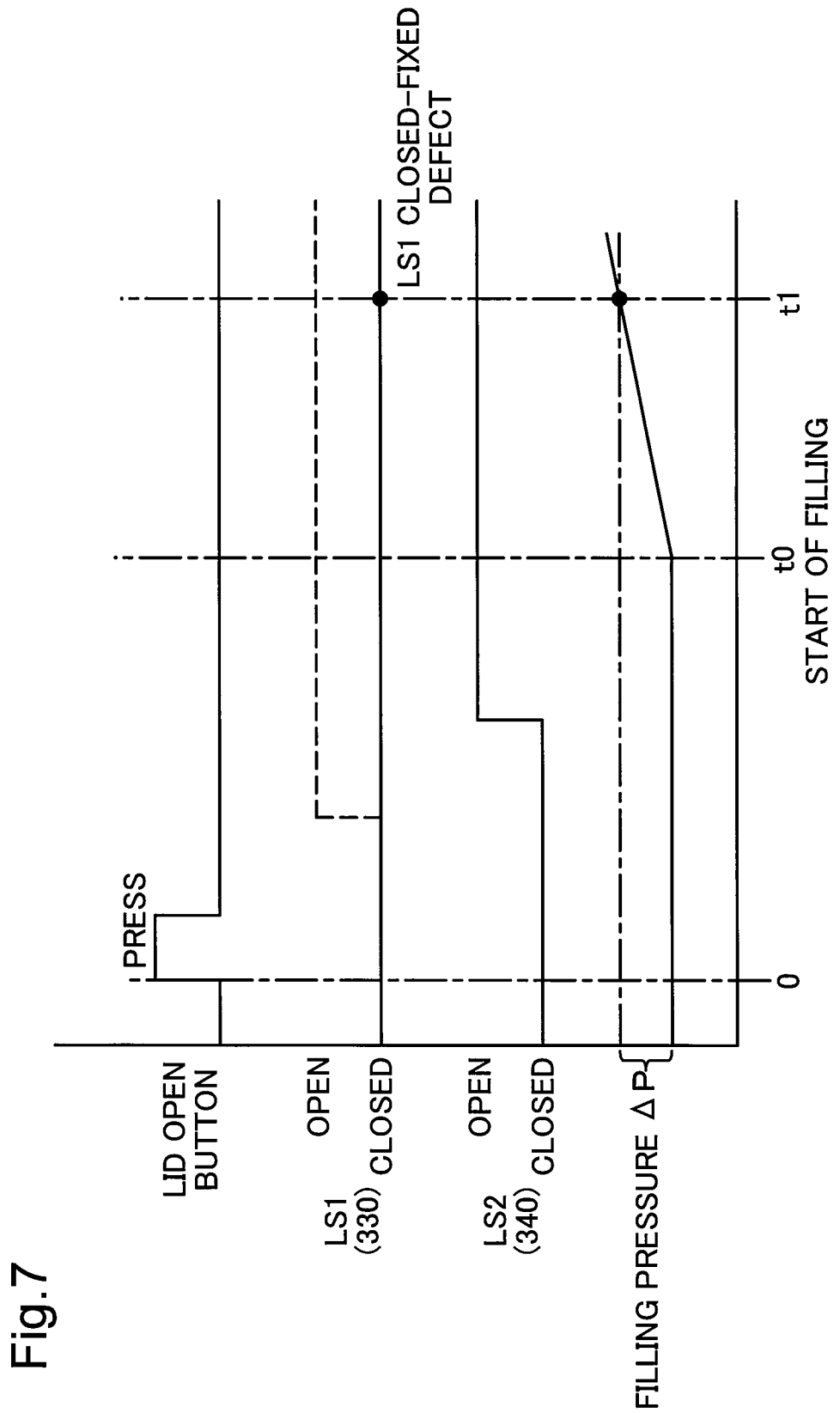
FIG. 7 is a diagram illustrating the principle of the closed-fixed defect with regard to the signals of the lid sensors.

FIG. 7 is a diagram illustrating the principle of the closed-fixed defect with regard to the signals LS1 and LS2 of the lid sensors 330 and 340. In the vehicle 10, in the state that the lid door 310 is physically open, the nozzle 520 of the hydrogen station 50 is connectable with the receptacle 215 of the vehicle 10 to fill hydrogen. The pressure sensor 260 of the vehicle 10 is monitored during hydrogen filling. In the state that the value of the pressure sensor 260 is increased by a pressure value $\Delta P$ that is not less than a predetermined reference value, when the signal LS1 of the first lid sensor 330 or the signal LS2 of the second lid sensor 340 indicates "closed", it is determinable that the lid sensor has a closed-fixed defect. Hydrogen filling is started after the lid open button 325 is pressed to open the lid door 310 and the nozzle 520 is connected with the receptacle 215. For example, hydrogen filling is started at time t0 in FIG. 7. It is assumed that the value of the pressure sensor 260 is increased from the value at the start of filling by the pressure value $\Delta P$ that is not less than the predetermined reference value at time t1. When the signal LS1 of the first lid sensor 330 or the signal LS2 of the second lid sensor 340 indicates "closed" at time t1, it is determinable that the lid sensor has a closed-fixed defect. In the illustrated example of FIG. 7, the controller 110 detects a closed-fixed defect of the first lid sensor. The reference value is set to a sufficiently small value that allows for detection of hydrogen filling.

Figure 8:
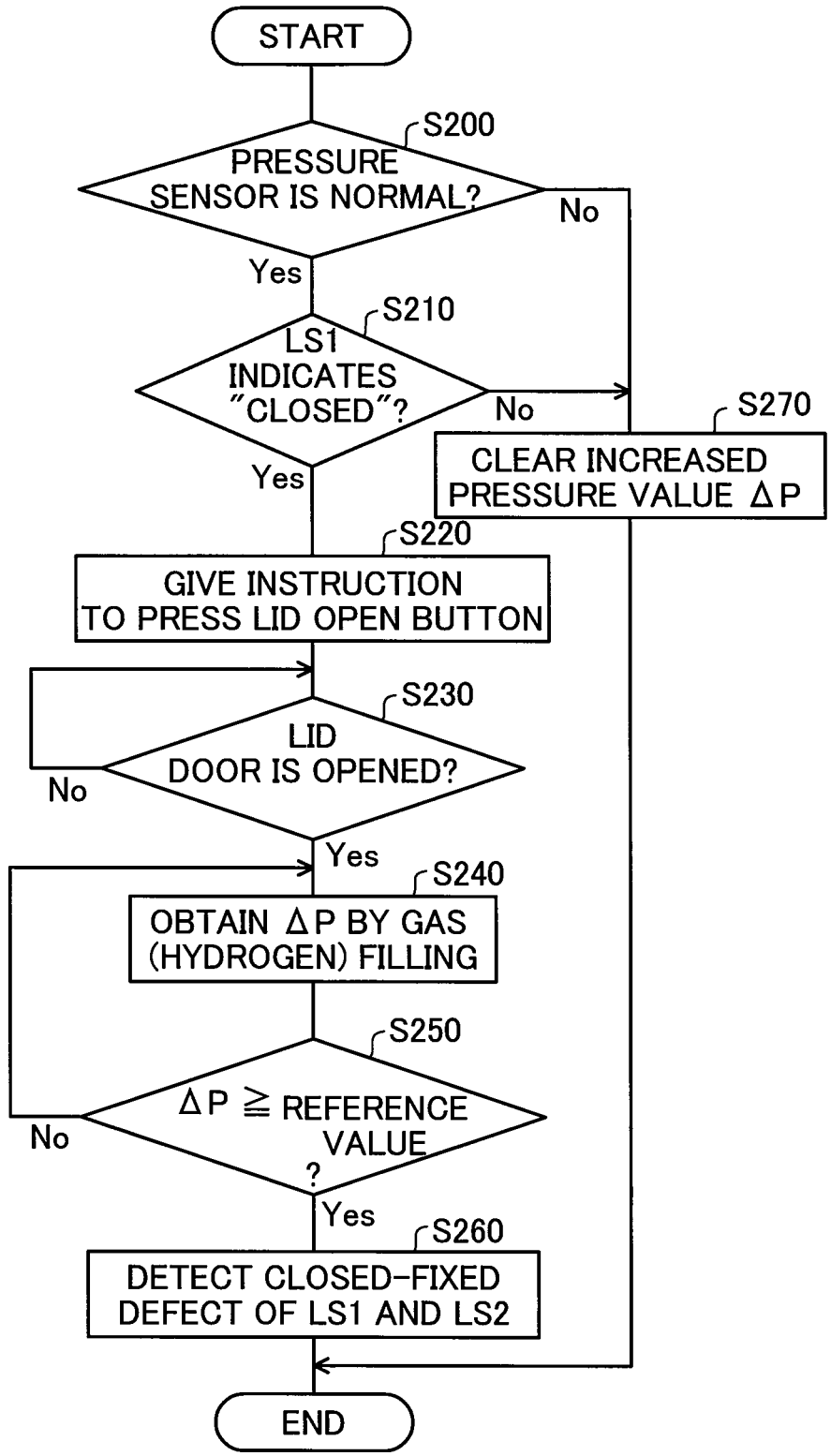
FIG. 8 is a flowchart showing a processing flow to detect a closed-fixed defect.

FIG. 8 is a flowchart showing a processing flow to detect a closed-fixed defect. At step S200, the controller 110 determines whether the output value of the pressure sensor 260 is in a predetermined normal range. When the output value of the pressure sensor 260 is in the predetermined normal range, the controller 110 proceeds to step S210. According to this embodiment, a closed-fixed defect of the lid sensor 330 or 340 is detected by using a pressure change. Accurate detection is accordingly impossible when the pressure is out of the normal range. In this case, the controller 110 proceeds from step S200 to step S270 to clear the increased pressure value $\Delta P$ by hydrogen filling without detecting a closed-fixed defect of the lid sensors 330 and 340. At step S210, the controller 110 determines whether the signal LS1 of the first lid sensor 330 indicates "closed". When the signal LS1 indicates "closed", the controller 110 proceeds to step S220. When the signal LS1 of the first lid sensor 330 indicates "open", on the other hand, there is no possibility of a closed-fixed defect of the first lid sensor 330. The controller 110 accordingly proceeds to step S270 to clear the increased pressure value $\Delta P$ by hydrogen filling.

At step S220, the controller 110 provides an instruction to press the lid open button 325 by voice or display on the display panel 118. At step S230, the controller 110 determines whether the lid door 310 is opened or is kept closed. More specifically, the controller 110 detects (1) press of the lid open button 325 or (2) switching of the signal LS2 of the second lid sensor 340 from "closed" to "open". The controller 110 may detect opening of the lid door 310 in response to the earlier between (1) and (2).

At step S240, the controller 110 obtains the output value (pressure value) of the pressure sensor 260 that increases with the progress of hydrogen filling. At step S250, the controller 110 determines whether the output value of the pressure sensor 260 is increased from the value at the start of filling by the pressure value $\Delta P$ that is not less than the predetermined reference value. When the output value of the pressure sensor 260 is increased from the value at the start of filling by the pressure value $\Delta P$ that is not less than the reference value, the controller 110 proceeds to step S260 to determine that the first lid sensor 330 has a closed-fixed defect. When the signal LS1 of the first lid sensor 330 indicates "closed" despite hydrogen filling with opening the lid door 310, the controller 110 determines that the first lid sensor 330 has a closed-fixed defect. A closed-fixed defect of the second lid sensor 340 is detectable by a similar procedure.

As described above, the third embodiment is configured to detect a closed-fixed defect of either of the two lid sensors 330 and 340. When both the two lid sensors 330 and 340 have a closed-fixed defect, the move of the vehicle 10 may be prohibited. In this case, the prohibition of the move of the vehicle 10 may be eliminated by input of the special operation, as described in the first embodiment or the second embodiment.

Modification 1:

In the first embodiment described above, in response to input of the special operation, the controller 110 registers the input record of the special operation and subsequently determines whether the prohibition of the move of the vehicle 10 is to be eliminated, based on the input record of the special operation. A modification may eliminate the prohibition of the move of the vehicle 10 in response to input of the special operation without registering the input of the special operation.

Modification 2:

The above embodiments use the two lid sensors 330 and 340. The number of lid sensors is, however, not limited to two but may be one or may be three or more.

The foregoing describes some aspects of the invention with reference to some embodiments and examples. The embodiments and the examples of the invention described above are provided only for the purpose of facilitating the understanding of the invention and not for the purpose of limiting the invention in any sense. The invention may be changed, modified and altered without departing from the scope of the invention and includes equivalents thereof.

REFERENCE SIGNS LIST

10 . . . vehicle
50 . . . hydrogen station
100 . . . fuel cells
110 . . . controller
115 . . . starter switch
118 . . . display panel
120 . . . required output detector
130 . . . secondary battery
140 . . . power distribution controller
150 . . . drive motor
160 . . . driveshaft
170 . . . power distribution gear
180 . . . wheel
200 . . . fuel tank
210 . . . fuel gas filler tube 215 . . . receptacle
218 . . . check valve
220 . . . check valve
240 . . . fuel gas supply tube
245 . . . main stop valve
250 . . . regulator
260 . . . pressure sensors
300 . . . lid box
310 . . . lid door
315 . . . hinge
320 . . . lid opener
325 . . . lid open button
330 . . . first lid sensor
340 . . . second lid sensor
350 . . . infrared transceiver
500 . . . gas tank
505 . . . gas supply tube
510 . . . gas supply hose
520 . . . nozzle
530 . . . valve
550 . . . infrared transceiver

What is claimed is:

1. A control method of a vehicle with a fuel cell mounted thereon, comprising:
    (a) if a signal of a lid sensor that is configured to detect opening and closing of a lid door for a gas filler port of the vehicle indicates that the lid door is open, then prohibiting move of the vehicle; and
    (b) if it is judged that the lid sensor has a defect or if a predetermined special operation is performed, then eliminating prohibition of the move of the vehicle despite that the signal of the lid sensor indicates that the lid door is open.

2. The control method according to claim 1,
    wherein the specific operation is an operation of pressing a starter switch of the vehicle by a driver of the vehicle after repetition of a predetermined special operation processing loop a specified number of times, and
    the special operation processing loop includes:
        pressing the starter switch by the driver;
        providing a predetermined notification; and
        pressing the starter switch again by the driver.

3. The control method according to claim 2,
    wherein the providing the notification includes at least one of notifying the driver of that the lid door is open, providing an instruction to close the lid door, and notifying the driver of a request for the specific operation.

4. The control method according to claim 2,
    wherein the providing the notification includes:
        providing a specific display by flashing a predetermined number of times or for a predetermined time duration; and
        turning off the specific display from flashing.

5. The control method according to claim 1,
    wherein if the signal of the lid sensor indicates that the lid door is closed to have a predetermined angle or less, then eliminating the prohibition of the move of the vehicle.

6. A vehicle with a fuel cell mounted thereon, comprising:
    a gas filler port that is configured to supply a fuel gas into the vehicle;
    a lid box that is configured to protect the gas filler port;
    a lid door that is a cover of the lid box;
    a lid sensor that is configured to detect opening and closing of the lid door;
    a controller configured to control move of the vehicle; and
    a starter switch that is configured to switch between activation and inactivation of the vehicle,
    after the starter switch is on, the controller to performs:
    (a) if a signal of a lid sensor that is configured to detect opening and closing of a lid door for a gas filler port of the vehicle indicates that the lid door is open, then prohibiting move of the vehicle; and
    (b) if it is judged that the lid sensor has a defect or if a predetermined special operation is performed, then eliminating prohibition of the move of the vehicle despite that the signal of the lid sensor indicates that the lid door is open.

7. The vehicle according to claim 6,
    wherein the specific operation is an operation of pressing a starter switch of the vehicle by a driver of the vehicle after repetition of a predetermined special operation processing loop a specified number of times, and
    the special operation processing loop includes:
        pressing the starter switch by the driver;
        providing a predetermined notification by the controller; and
        pressing the starter switch again by the driver.

8. The vehicle according to claim 7,
    wherein the providing the notification includes at least one of notifying the driver of that the lid door is open, the controller provides an instruction to close the lid door and notifies the driver of a request for the specific operation.

9. The vehicle according to claim 7,
    wherein the providing the notification includes:
        providing a specific display by flashing a predetermined number of times or for a predetermined time duration; and
        turning off the specific display from flashing.

10. The vehicle according to claim 6,
    wherein if the signal of the lid sensor indicates that the lid door is closed to have a predetermined angle or less, then the controller eliminates the prohibition of the move of the vehicle.

* * * * *